(12) United States Patent
Hwang

(10) Patent No.: US 6,600,865 B2
(45) Date of Patent: Jul. 29, 2003

(54) STACKED GBIC GUIDE RAIL ASSEMBLY

(75) Inventor: Jenq-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 62 days.

(21) Appl. No.: 09/888,249

(22) Filed: Jun. 21, 2001

(65) Prior Publication Data

US 2002/0197043 A1 Dec. 26, 2002

(51) Int. Cl.⁷ .................. H01R 13/60; H01R 13/66
(52) U.S. Cl. .............. 385/134; 439/541.5; 439/607; 361/760
(58) Field of Search .................. 439/541.5, 607; 385/134; 361/748, 760

(56) References Cited

U.S. PATENT DOCUMENTS

| | | | | |
|---|---|---|---|---|
| 5,316,488 A | * | 5/1994 | Gardner et al. ............... 439/79 |
| 6,132,243 A | * | 10/2000 | Hirata et al. ............. 439/541.5 |
| 6,213,813 B1 | * | 4/2001 | Huang ......................... 439/607 |
| 6,227,880 B1 | * | 5/2001 | Zhu et al. ..................... 439/92 |
| 6,227,904 B1 | * | 5/2001 | Wang et al. .............. 439/541.5 |
| 6,272,019 B1 | * | 8/2001 | Edwards et al. ............ 361/760 |
| 6,276,963 B1 | * | 8/2001 | Avery et al. ............. 439/541.5 |
| 6,302,737 B1 | * | 10/2001 | Billman ...................... 439/607 |

* cited by examiner

*Primary Examiner*—Michael C. Zarroli
(74) *Attorney, Agent, or Firm*—Wei Te Chung

(57) ABSTRACT

A stacked Gigabyte Interface Converter (GBIC) guide rail assembly for removable optoelectronic modules includes a raiser mounted on a circuit board, a plurality of guide rails fixed to the raiser, and a plurality of spacers spacing the guide rails from each other. The guide rails receive and accommodate transceivers therein for forming a dense arrangement of the transceivers. The lowest guide rail is mounted and supported on the circuit board.

14 Claims, 5 Drawing Sheets

STACKED GBIC GUIDE RAIL ASSEMBLY

BACKGROUND OF THE INVENTION

1. Field of the Invention

The present invention relates generally to an optoelectronic module guide system, and particularly to a stacked gigabyte interface converter (GBIC) guide rail assembly for removable optoelectronic modules, such as transceiver modules that interface with peripheral devices.

2. Description of Related Art

As known in the art, it is desirable to optimize multi-transceiver configuration in order to increase the port density associated with the network connection, such as switch boxes, wiring closets, and computer I/O.

An equipment in the prior art for accommodating optoelectronic transceivers therein generally has cables connected to the equipment. As disclosed in U.S. Pat. No. 5,373,421, an assembly for accommodating fiber optic transceivers comprising a front plate having a plurality of holes, a plurality of accommodating members attached to the rear of the front plate and extending vertically from each of the plurality of holes. The assembly is generally used for a fiber optic transceiver with an optic fiber cable attached to the front and a copper wire cable attached to the rear.

U.S. Pat. No. 6,074,228 also discloses a low-profile electronic connector system for removable transceiver modules which includes a wedge electrical connector surface-mounted on a printed circuit board and a bracket having an opening for receiving transceivers mounted perpendicularly to the printed circuit board. Though this design presents low-profile advantages, a great amount of space on the print circuit board is required for a multi-transceiver configuration.

SUMMARY OF THE INVENTION

In view of the above, it is an object of the present invention to provide a stacked GBIC guide rail assembly for accommodating transceivers with a relatively low profile.

It is another object of the present invention to provide a stacked GBIC guide rail assembly for saving space on a printed circuit board in order to increase the port density associated with the network connection.

Also, it is an object of the present invention to provide a stacked GBIC guide rail assembly comprising SCA2 receptacles electrically connected by a flexible printed circuit to a printed circuit board.

In order to achieve the objects set above, a stacked GBIC guide rail assembly for removable optoelectronic modules comprises a raiser, a plurality of guide rails, and a plurality of spacers in conjunction with a printed circuit board, wherein the guide rails for accommodating transceivers are stackedly attached to the raiser and spaced by the spacers. The lowest rail guide is mounted to the printed circuit board.

Other objects, advantages and novel features of the invention will become more apparent from the following detailed description when taken in conjunction with the accompanying drawings, in which:

DETAILED DESCRIPTION OF PREFERRED EMBODIMENT OF THE INVENTION

Reference will now be made to the drawings to describe the present invention in detail.

Figure 1:
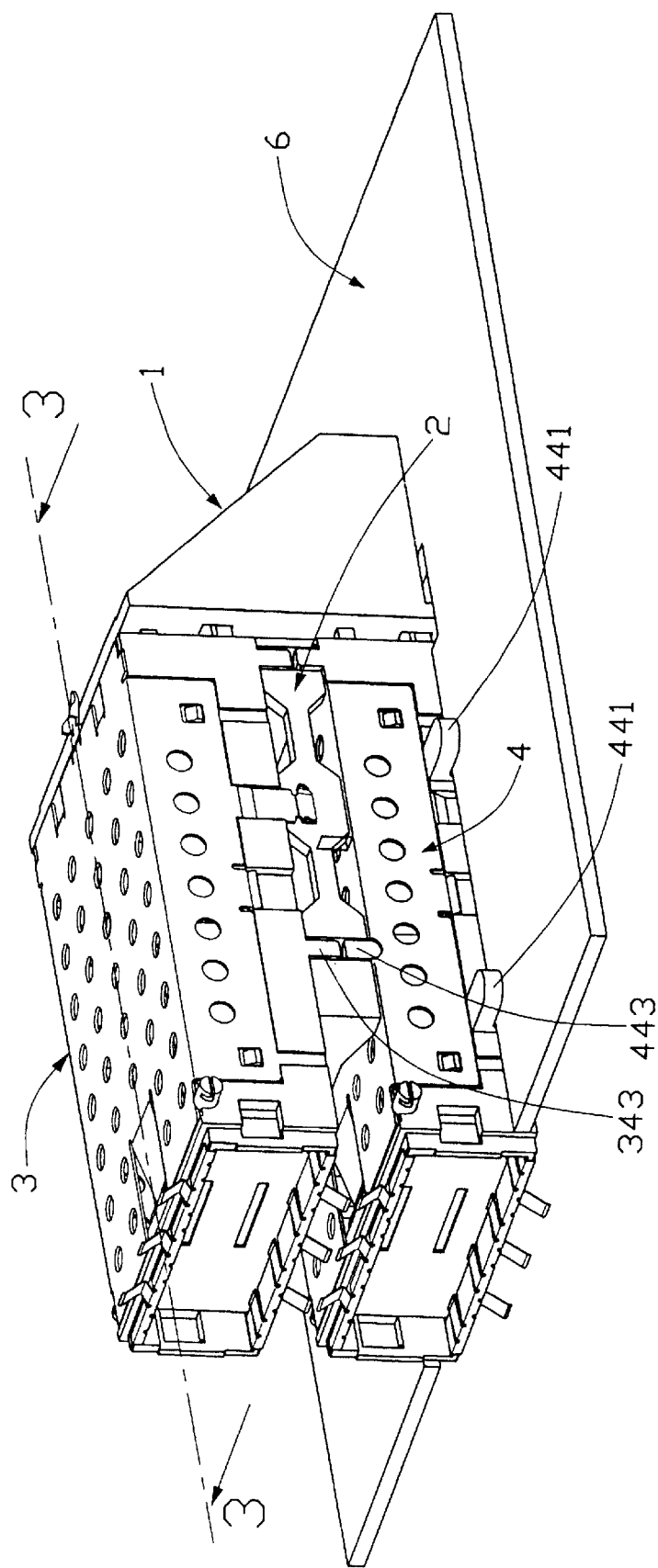
FIG. 1 is a perspective view of a stacked GBIC guide rail assembly in accordance with the present invention.

Referring to the drawings, and particularly to FIG. 1, a stacked GBIC guide rail assembly in accordance with the present invention comprises a raiser 1, a spacer 2, an upper guide rail 3, and a lower guide rail 4. The upper guide rail 3 and the lower guide rail 4 are capable to receive and accommodate transceivers therein. The upper and lower guide rail 3, 4 are engaged with the raiser 1 and spaced by the spacer 2 and the lower guide rail 4 is mounted to a printed circuit board 6.

Figure 2:
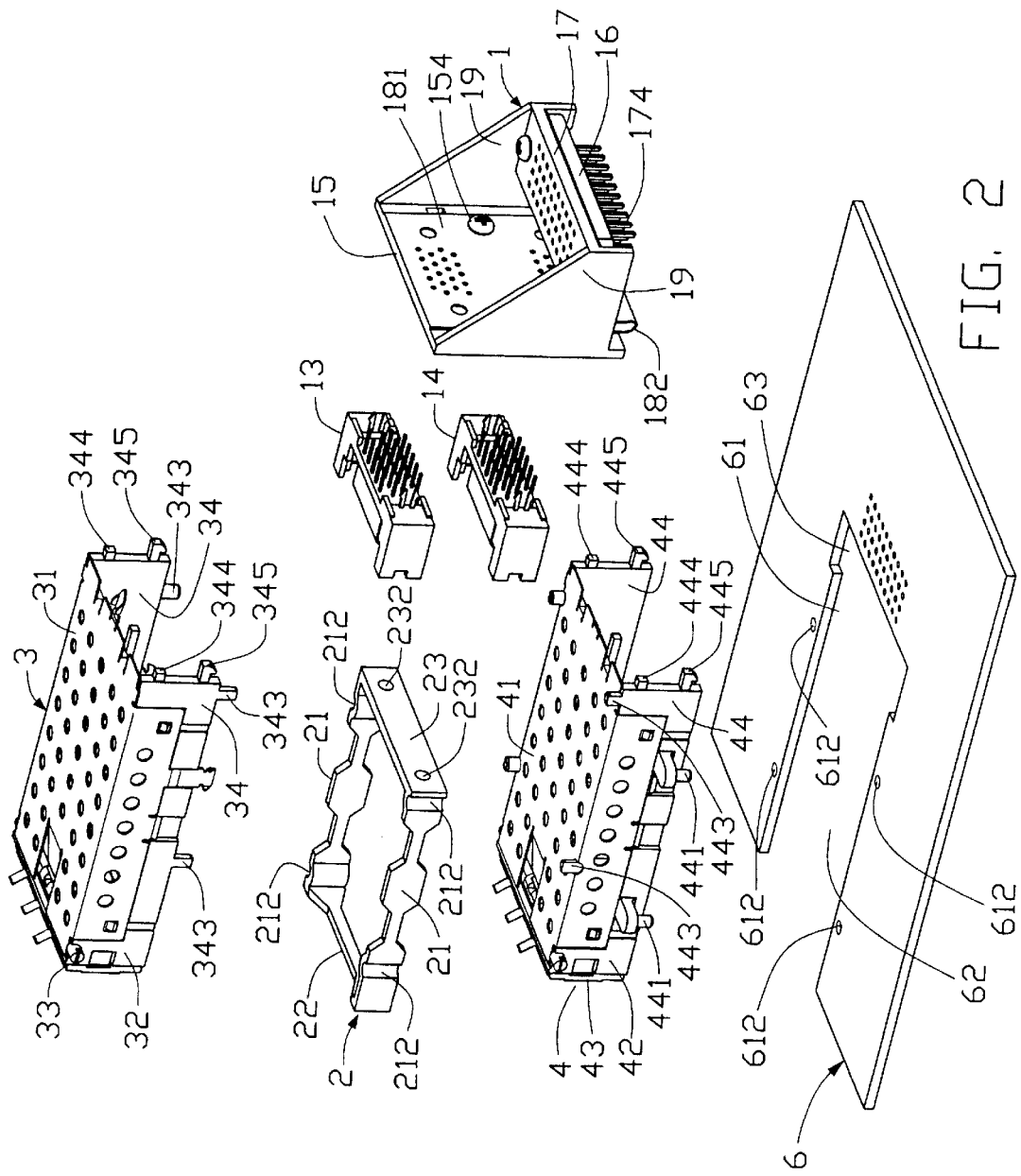
FIG. 2 is a exploded view of the stacked GBIC guide rail assembly of the present invention.
Figure 3:
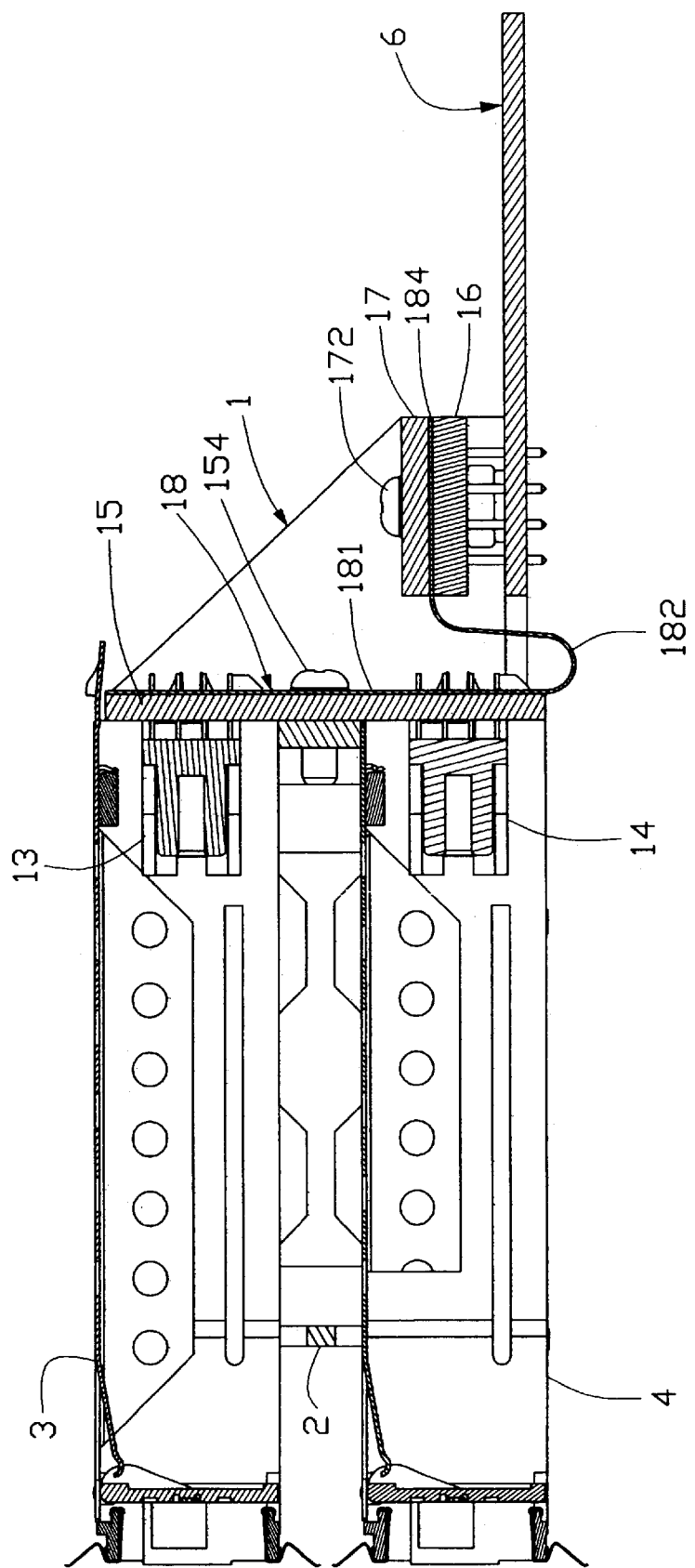
FIG. 3 is a cross-sectional view of taken alone line 3—3 of FIG. 1.

Turning to FIGS. 2 and 3, the raiser 1 comprises a first wall 15 and two parallel sidewalls 19 extending from the first wall 15. A base 17 having a plurality of contact pins 174 soldered to the printed circuit board 6 is formed between the sidewalls 19.

Figure 4:
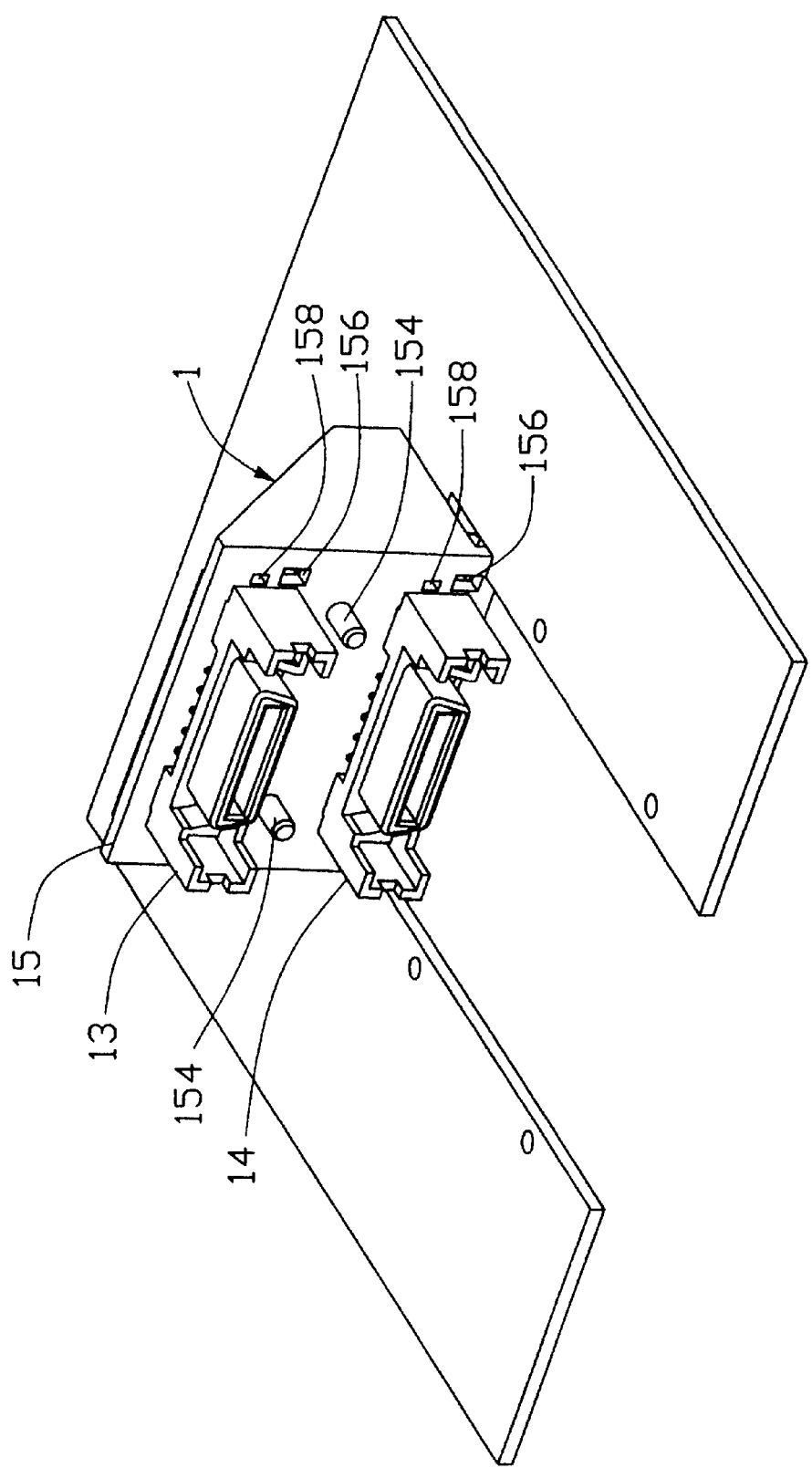
FIG. 4 is a perspective view of a raiser with two SAC2 receptacles mounted thereon and a printed circuit board of the stacked GBIC guide rail assembly of the present invention.

Also referring to FIG. 4, an upper SCA2 receptacle 13 and a lower SCA2 receptacle 14 are attached to the first wall 15 of the raiser 1. Two pairs of retaining windows 156 are respectively defined in the first wall 15 on opposite sides of the corresponding SCA2 receptacle 13, 14. The SCA2 receptacles 13, 14 which can be replaced by other electrical connection devices serve to electrically engage the transceivers received in the guide rails 3, 4. In addition, two pairs of opposing recesses 158 are respectively defined in the first wall 15 and each vertically adjacent to the corresponding retaining window 156. A pair of screws 154 is formed in the first wall 15 for fastening the spacer 2 (depicted in FIG. 2) to the first wall 15.

Turning to FIGS. 2 and 3, a first portion 181 of a flexible printed circuit (FPC) 18 is affixed to the first wall 15, for connection with the SCA2 receptacles thereby electrically connecting the transceivers to the printed circuit board 6. A second portion 184 of the FPC 18 is bent upwardly at the bottom of the raiser 1 with a bending potion 182 being formed and sandwiched between the base 17 and a plate 16 that is fastened to the base 17 by screws 172.

Figure 5:
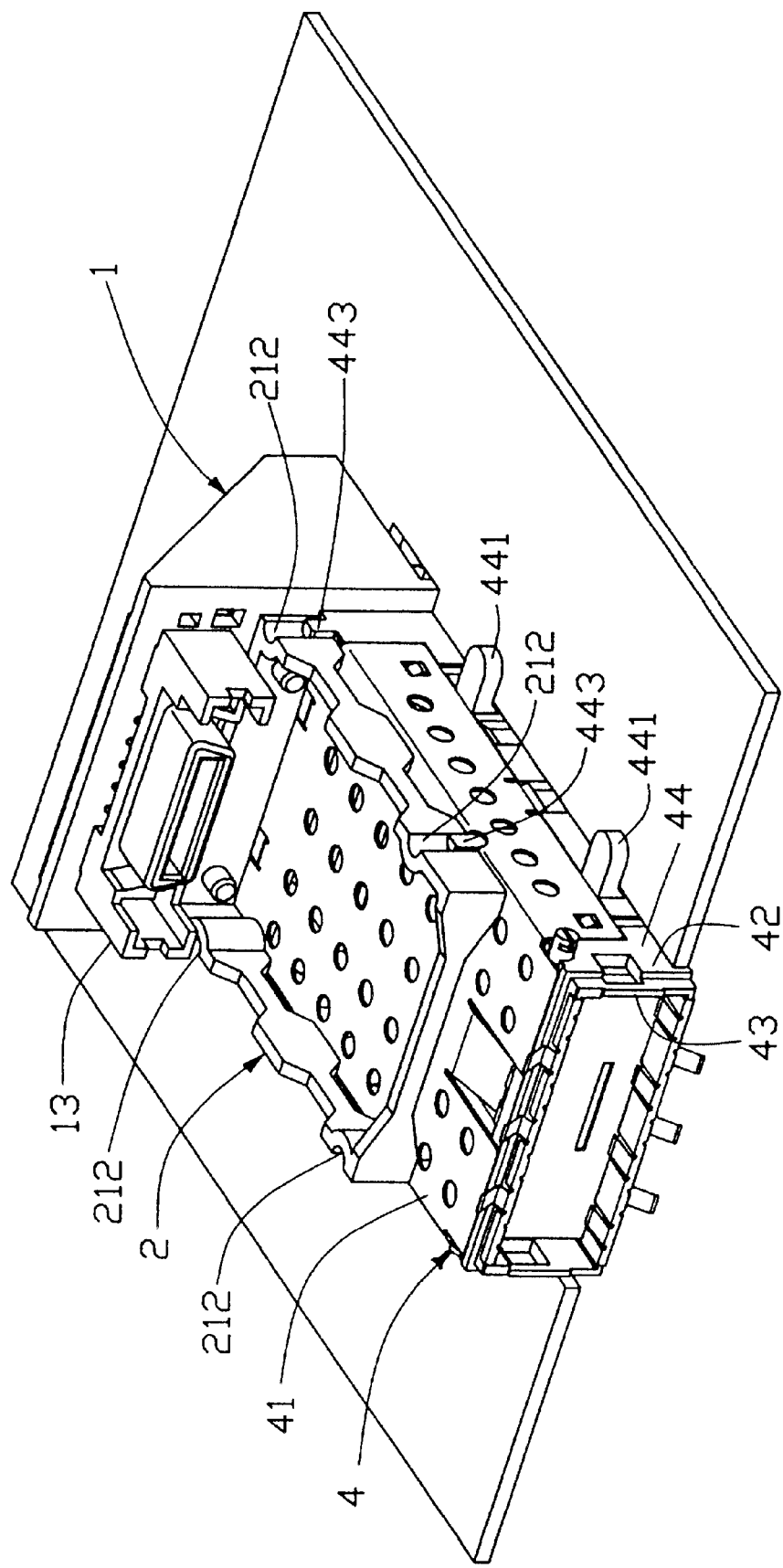
FIG. 5 is a perspective view of the stacked GBIC guide rail assembly without an upper guide rail of the present invention.

Referring to FIGS. 2 and 5, the lower rail guide 4 comprises an upper cover 41 and a frame 42 covered by the upper cover 41. The frame 42 comprises a window 43 and two parallel sidewalls 44 extending from the window 43. Opposite to the window 43 of the frame 42, a cross beam (not shown) is formed between the sidewalls 44. Two positioning posts 443 are formed in each sidewall 44, and two supporting posts 441 are formed in each sidewall 44. In addition, a positioning protrusion 444 and a hook 445, opposite to the window 43 of the frame 42, are formed on an end of each sidewall 44. A swivel door (not labeled) is disposed about the window 43.

Similar to the lower guide rail 4, the upper guide rail 3 also comprises an upper cover 31 and a frame 32 covered by the upper cover 31. The frame 32 comprises a window 33, two parallel sidewalls 34 extending from the window 33, and a cross beam (not shown) formed between the two sidewalls 34 and opposite to the window 33 of the frame 32. Two positioning posts 343 are formed on each sidewall 34. In addition, a positioning protrusion 344 and a hook 345, opposite to the window 33 of the frame 32, are formed on an end of each sidewall 34. A swivel door (not labeled) is disposed about the window 33.

Turning to FIGS. 2 and 5, the spacer 2 comprises two parallel side members 21, a cross arm 22 and a front plate 23. A pairs of positioning slots 212 is defined in each side member 21, for receivingly mating with the corresponding positioning posts 443 of the lower guide rail 4 and positioning posts 343 of the upper guide rail 3. The spacer 2 is secured to the raiser 1 by the screws 154 engaging screw holes 232 defined in the front plate 23.

An opening 61 having a first rectangular zone 62 for receiving the lower rail guide 4 therein and a second rectangular zone 63 for receiving the raiser 1 therein is defined in an edge of the printed circuit board 6. Two pairs of holes 612 are defined on opposite sides of the first zone 62 for receiving the corresponding supporting posts 441 of the lower guide rail 4.

FIG. 5 depicts a partially-assembled condition of a stacked guide rail assembly of the present invention. The lower rail guide 4 is retained in the first rectangular zone 62 of the opening 61 by the supporting posts 441 engaging with the corresponding holes 612. The positioning protrusions 444 of the lower rail guide 4 received in the corresponding recesses 158 of the raiser 1 and the hooks 445 engage in the retaining windows 156 of the raiser 1.

FIG. 1 depicts a fully-assembled condition of the stacked guide rail assembly of the present invention. The upper guide rail 3 is retained by the positioning protrusions 344 received in the corresponding recesses 158 of the raiser and the hooks 345 engaging in the corresponding retaining windows 156 of the raiser 1. The spacer 2 is substantially parallel with the printed circuit board 6.

It is understood that in describing the top and bottom portions of the stacked guide rail assembly and its respective frame components, the terms "top" and "bottom" are used by way of example only due to the orientation of the drawings. In addition, even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stacked guide rail assembly for use with a printed circuit board comprising:
   a raiser adapted to be mounted on the printed circuit board, the raiser comprising at least two electrical connection devices attached thereto, the connection devices electrically connected to the printed circuit board;
   at least two guide rails fixed to the raiser, each adapted to receive and accommodate one transceiver, each of the connection devices being for connecting a corresponding one of the transceivers to the printed circuit board;
   at least a spacer arranged between the guide rails and fastened to the raiser; and a flexible printed circuit electrically connecting the connection devices to the printed circuit board.

2. The stacked guide rail assembly as described in claim 1, wherein at least one of the connection devices is an SCA2 receptacle.

3. The stacked guide rail assembly as described in claim 1, wherein the raiser comprises a base adapted to be electrically connected to the flexible printed circuit and having a plurality of contact pins adapted to be soldered to the printed circuit board.

4. The stacked guide rail assembly as described in claim 3, wherein the flexible printed circuit forms a bending portion serving as a strain relief.

5. The stacked guide rail assembly as described in claim 1, wherein the spacer comprises at least two positioning members for positioning the guide rails.

6. The stacked guide rail assembly as described in claim 1, wherein one of the guide rails comprises supporting members for supporting the stacked guide rail assembly on the printed circuit board.

7. A transceiver guide rail assembly comprising:
   a guide rail adapted to receive and accommodate a transceiver;
   a raiser attached to the guide rail and comprising an electrical connection device corresponding to the guide rail for engaging and electrically connecting the transceiver; and
   a printed circuit board defining an opening for receiving the guide rail therein; a flexible printed circuit;
   wherein the connection device is electrically connected to the printed circuit board by the flexible printed circuit, and the raiser is mounted on the printed circuit board.

8. The transceiver guide rail assembly as described in claim 7, wherein the raiser comprises a base which is electrically connected to the flexible printed circuit and which has a plurality of contact pins soldered to the printed circuit board.

9. The transceiver guide rail assembly as described in claim 8, wherein the flexible printed circuit forms a bending portion for serving as a strain relief.

10. The transceiver guide rail assembly as described in claim 7, wherein the guide rail comprises supporting members for supporting the transceiver guide rail assembly on the printed circuit board.

11. A stacked guide rail assembly comprising:
    a printed circuit board;
    two guide rails stacked on each other, a lower guide rail being mounted on said printed circuit board;
    each of said guide rails defining a space therein for receiving a transceiver therein, a window formed on a front portion of the guide rail with a swivel door disposed thereabout; and
    two stacked connectors positioned around rear portions of said two guide rails, each of said two connector aligned with a corresponding guide rail; wherein each of the two connectors is separately formed with regard to the corresponding guide rail and extends into the space of the corresponding guide rail for connecting to the corresponding transceiver in the same space; wherein said two connectors are fixed on a raiser mounted to the printed circuit board.

12. The assembly as described in claim 11, wherein a spacer is disposed between said two guide rails.

13. The assembly as described in claim 11, wherein a spacer is disposed between the two guide rails and said spacer is fixed to the raiser.

14. The assembly as described in claim 11, wherein said two connectors are electrically connected to the printed circuit board.

* * * * *